US008667860B2

(12) United States Patent
Helmer et al.

(10) Patent No.: US 8,667,860 B2
(45) Date of Patent: Mar. 11, 2014

(54) ACTIVE GRIPPER FOR HAPTIC DEVICES

(75) Inventors: Patrick Helmer, Bernex (CH); Francois Conti, Menlo Park, CA (US); Sébastien Grange, Sion (CH); Patrice Rouiller, Trélex (CH)

(73) Assignee: Force Dimension S.a.r.l., Lausanne (CH)

( * ) Notice: Subject to any disclaimer, the term of this patent is extended or adjusted under 35 U.S.C. 154(b) by 1013 days.

(21) Appl. No.: 12/306,825

(22) PCT Filed: Jun. 26, 2007

(86) PCT No.: PCT/EP2007/005655
§ 371 (c)(1),
(2), (4) Date: Jan. 4, 2010

(87) PCT Pub. No.: WO2008/003416
PCT Pub. Date: Jan. 10, 2008

(65) Prior Publication Data
US 2012/0090423 A1    Apr. 19, 2012

(30) Foreign Application Priority Data

Jul. 3, 2006 (EP) ..................................... 06013754

(51) Int. Cl.
*B25J 3/02*          (2006.01)
(52) U.S. Cl.
USPC ............................. 74/490.01; 901/33; 901/34
(58) Field of Classification Search
USPC .................................... 901/34, 33; 74/490.01
See application file for complete search history.

(56) References Cited

U.S. PATENT DOCUMENTS

| 3,171,549    | A    |   | 3/1965  | Orloff          |         |
|--------------|------|---|---------|-----------------|---------|
| 4,555,960    | A    |   | 12/1985 | King            |         |
| 4,795,296    | A    |   | 1/1989  | Jau             |         |
| 4,976,582    | A    | * | 12/1990 | Clavel          | 414/729 |
| 5,004,391    | A    |   | 4/1991  | Burdea          |         |
| 6,377,011    | B1   | * | 4/2002  | Ben-Ur          | 318/566 |
| 2003/0146898 | A1   |   | 8/2003  | Kawasaki et al. |         |
| 2005/0043718 | A1   |   | 2/2005  | Madhani et al.  |         |

FOREIGN PATENT DOCUMENTS

| EP | 1 199 622   | 4/2002 |
|----|-------------|--------|
| FR | 2 863 534   | 6/2005 |
| WO | WO 92/05016 | 4/1992 |

(Continued)

OTHER PUBLICATIONS

Abstract for EP 1 199 622.
Abstract for FR 2 863 534.

(Continued)

*Primary Examiner* — David M Fenstermacher
*Assistant Examiner* — Terence Boes
(74) *Attorney, Agent, or Firm* — Frost Brown Todd LLC

(57) ABSTRACT

An active gripper for a haptic device including a parallel kinematics structure providing at least three degrees of freedom including three translational degrees of freedom, wherein the gripper comprises a first contact surface being adapted for contact by a first portion of a hand of a user, a second contact surface being adapted for contact by a second portion of the user's hand, which hand's second portion being moveable in relation to the hand's first portion, and a moveable member arranged between the first contact surface and the second contact surface and being adapted to actively move the first contact surface and the second contact surface in relation to each other.

17 Claims, 11 Drawing Sheets

(56) References Cited

FOREIGN PATENT DOCUMENTS

| WO | WO 99/27320 | 6/1999 |
| WO | WO 01/41052 | 6/2001 |
| WO | WO 01/87550 | 11/2001 |
| WO | WO 02/07143 | 1/2002 |
| WO | WO 03/009212 | 1/2003 |
| WO | WO 03/038541 | 5/2003 |
| WO | WO 2005/116802 | 12/2005 |

OTHER PUBLICATIONS

Extended European Search Report dated Jan. 24, 2007 for Application No. 06013754.

Gosselin, C.M., "On the design of gravity-compensated six-degree-of-freedom parallel mechanisms," Proceedings of the IEEE International Conference on Robotics & Automation (May 1998) pp. 2287-2294.

International Search Report dated Aug. 31, 2007 for Application No. PCT/EP2007/005655.

* cited by examiner

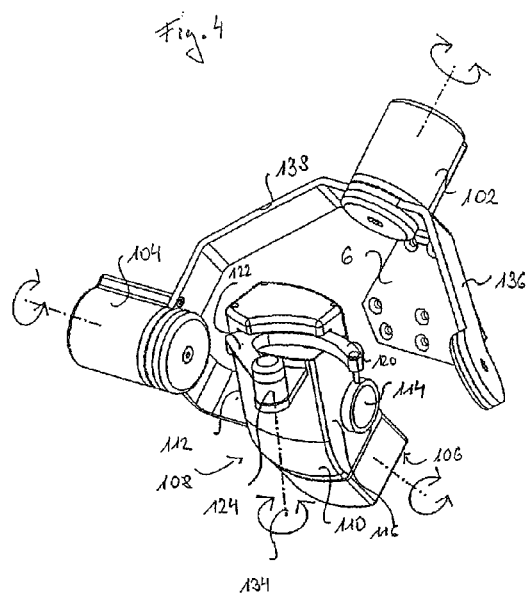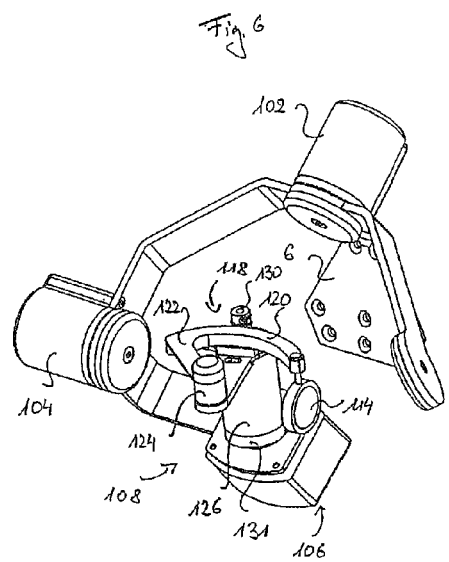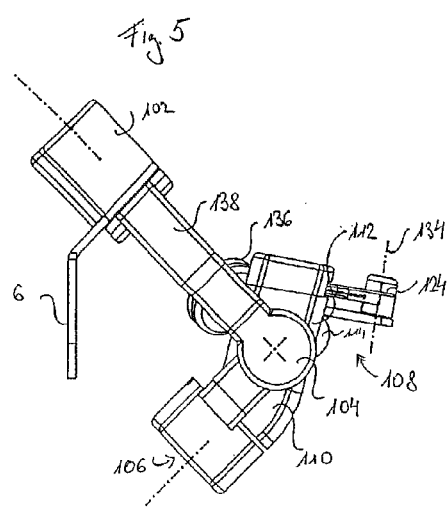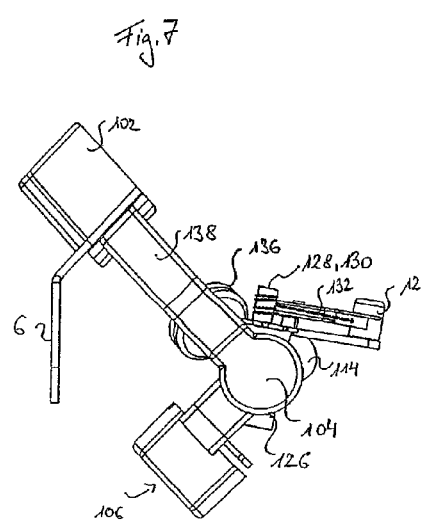

ACTIVE GRIPPER FOR HAPTIC DEVICES

FIELD OF THE INVENTION

The present invention generally relates to haptic devices and more particular to an active gripper for haptic devices.

BACKGROUND OF THE INVENTION

Haptic devices form specific man-machine interfaces. A haptic device provides, on the one hand, control and, on the other hand, tactile sensation to interaction with a technical system. A haptic device provides its user with force-feedback information on the motion and/or force input generated by the user.

Applications, for which haptic devices may be used, include robotics, tele-operation, minimal invasive surgery, simulators and computer-based games.

A characteristic of a haptic device is its force rendering capabilities when a virtual contact with a hard body is simulated. To this end, haptic devices including parallel kinematics structures, for example a so-called Delta parallel kinematics structure, are well suited. The parallel kinematics design provides for high mechanical stiffness and low mass/inertia and, thus, high static and dynamic stiffness as well as high force levels. Such haptic devices may be used, for example, as robot or manipulator for performing programmed tasks or as a haptic device where force constraints can be applied into the hands of the operator.

Another characteristic of a haptic device is transparency. Haptic transparency is a performance criteria used to quantify the fidelity with which virtual object properties are presented to and perceived by the human user through a haptic device when the user's hand is in contact therewith.

Also, human factors are parameters to be considered in designing haptic devices, particularly with respect to components for direct contact with a user. Such components include so-called grippers. Grippers can be considered as—from users' point of view—the "handle" or "grip" of a haptic device for manual operation thereof. Grippers are usually coupled with local end-effectors of haptic devices.

Known grippers allow single point contact (e.g. by means of single finger tip) interaction with a simulated or remote environment. For manipulations, rather simple gripper designs may be used, such as pen-like and sphere-shaped structures. For multiple point interaction, which greatly enhances manipulation capabilities of the user, more complex gripper designs are required.

In, for example, virtual environment applications, an object can be grasped through the use of a virtual hand or grasping tool, which can be controlled by manipulating a gripper of a haptic device.

Human dexterity in manipulating objects is greatly determined by grasping possibility, sensual sensations and haptic feedback between different parts of a user's hand, for example thumb and fingers. To this end, so-called active or actuated grippers are envisaged (in the following, the term "active gripper" will be used). The term "active" indicates that a gripper may generate (display) forces and/or torques towards a user, for example, to provide force feedback, haptic information and the like.

Known grippers may display forces and/or torques generated passively (e.g. by means of a spring releasing energy previously input by a user), generated discretely (e.g. bi-stable components providing two distinct states [pushed vs. release] to display a short stroke possible with a tactile "click"), generated in general linear manner (e.g. a longer stroke with smooth force variation) and generated in virtually any degree of freedom (e.g. by an actuator).

Drawbacks of known active gripper include workspace requirements, bulkiness, high weight, complex design and insufficient (unrealistic) display of forces and/or torques towards users.

OBJECT OF THE INVENTION

It is the object of the present invention to provide an enhanced active gripper and a respective haptic device resolving at least some of the drawbacks of known approaches, particularly concerning display of forces and/or torques towards users.

SUMMARY OF THE INVENTION

To solve the above object, the present invention provides an active gripper for a haptic device including a parallel kinematics structure providing at least three degrees of freedom including three translational degrees of freedom, wherein the gripper comprises a first contact surface being adapted for contact by a first portion of a hand of a user, a second contact surface being adapted for contact by a second portion of the user's hand, which hand's second portion being moveable in relation to the hand's first portion, and a moveable member arranged between the first contact surface and the second contact surface and being adapted to actively move the first contact surface and the second contact surface in relation to each other.

The present invention provides further a haptic device comprising an end-effector, a parallel kinematics structure providing three translational degrees of freedom on the end-effector and an active gripper as set forth above.

SHORT DESCRIPTION OF THE DRAWINGS

Embodiments of the invention will now be described, by way of example, and with reference to the accompanying drawings, in which.

Figure 1:
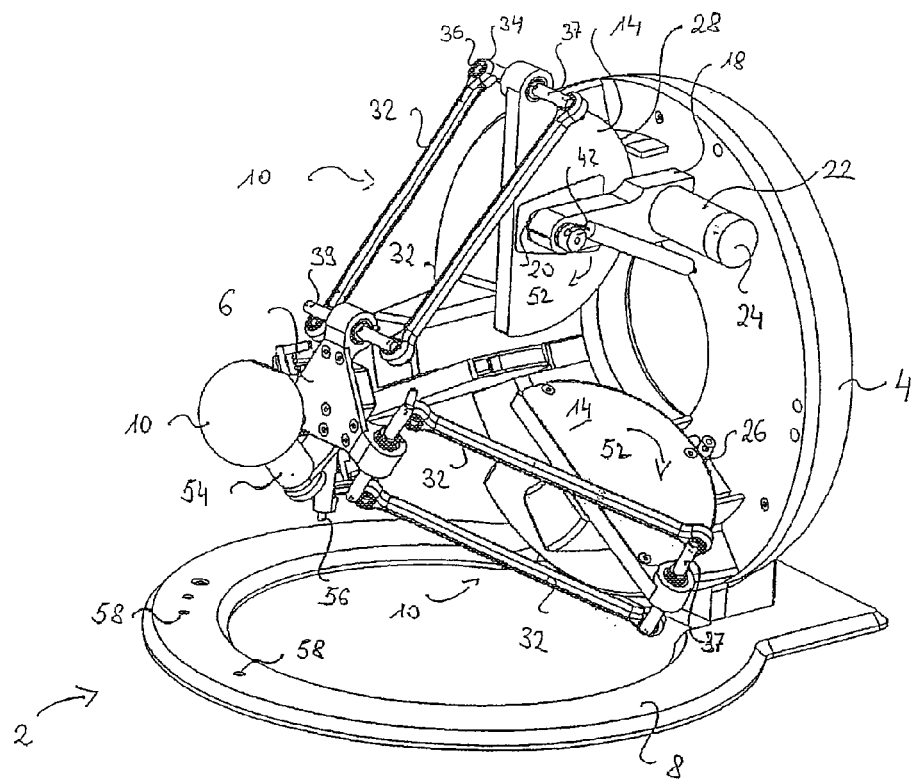
FIG. 1 illustrates a preferred embodiment of the present invention.
Figure 2:
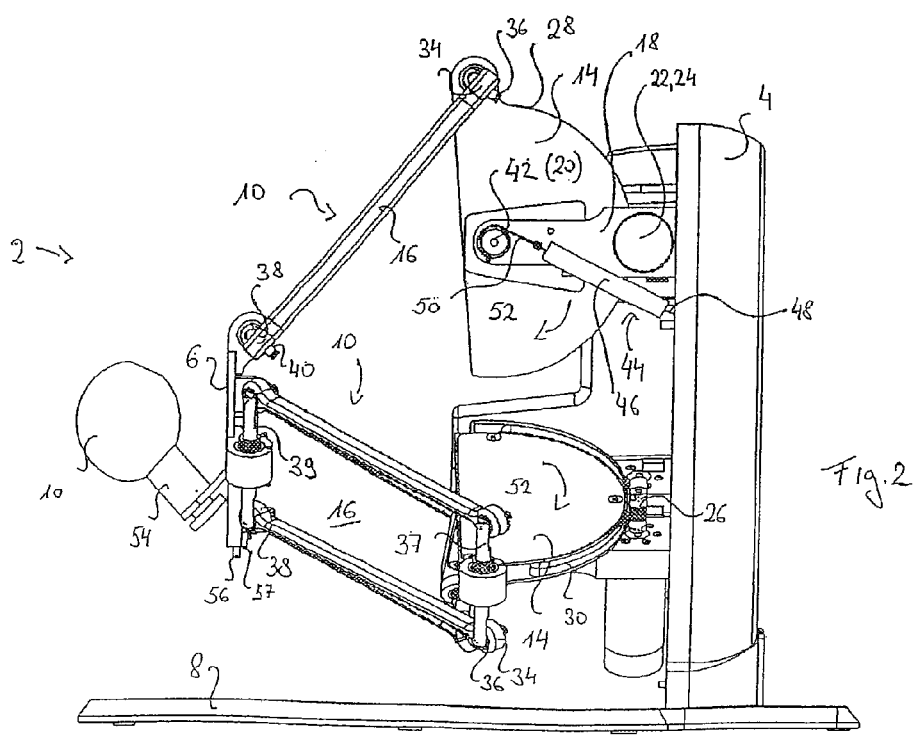
FIG. 2 shows a side view of the embodiment of FIG. 1.
Figure 3A:
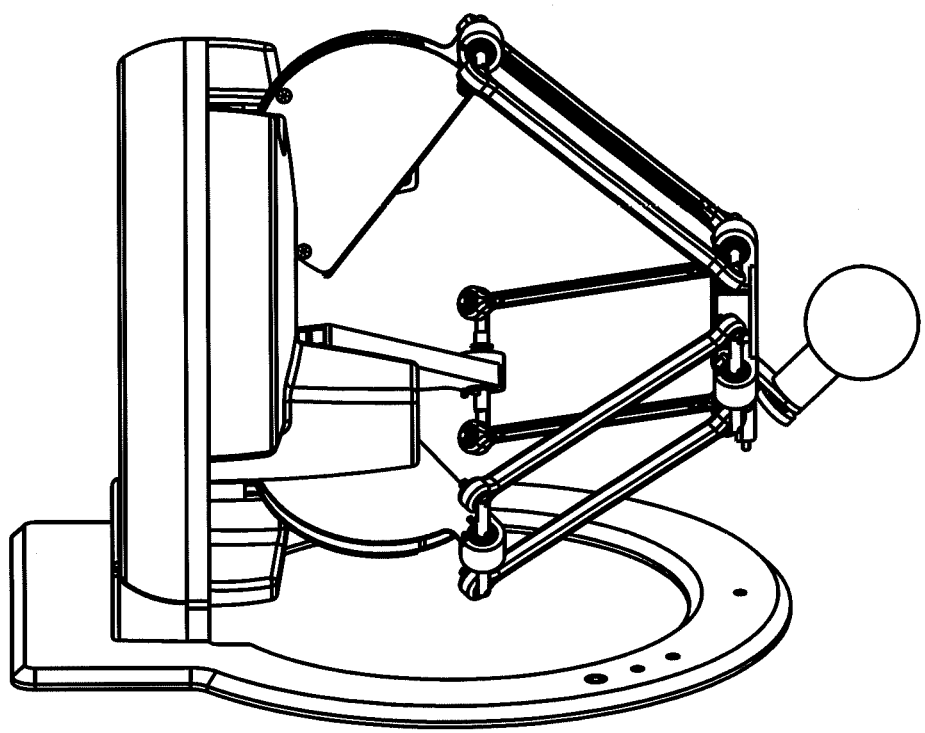
Figure 3B:
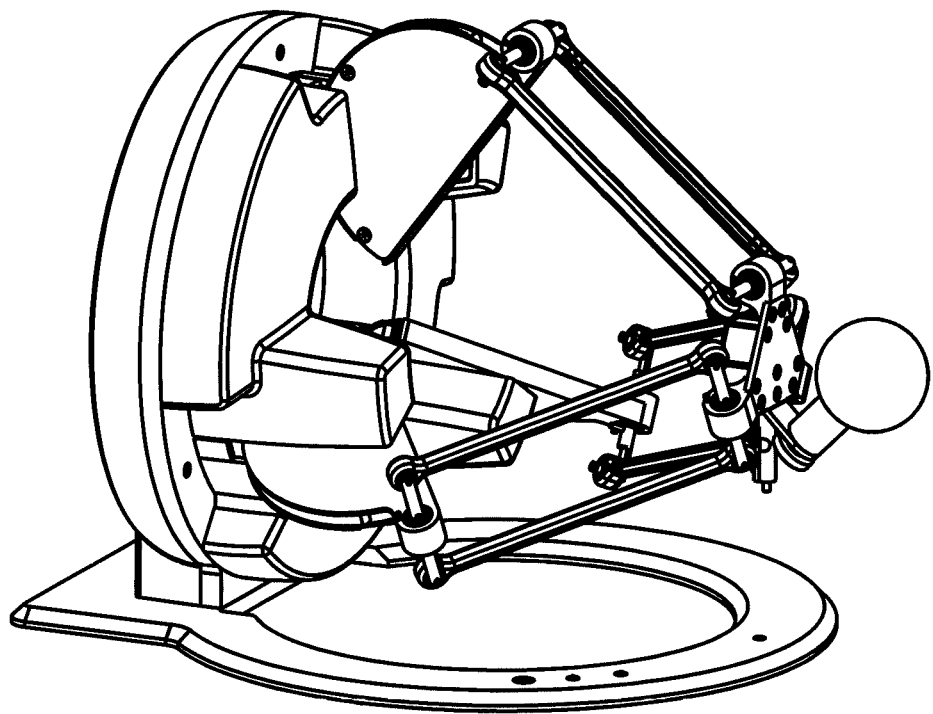

FIGS. 3A and 3B show perspective illustrations of the embodiment of FIGS. 1 and 2, FIG. 4 illustrates a preferred embodiment of a wrist structure including a gripper for active grasping, FIG. 5 shows a left side view of the embodiment of FIG. 4, FIG. 6 illustrates the embodiment of FIG. 4 without gripper housing, FIG. 7 shows a left side view of FIG. 6, FIGS. 8A to 8C show perspective illustrations of the embodiment of FIGS. 4 to 7; and FIGS. 9A to 9D show perspective illustrations of a preferred embodiment of a wrist structure including a pen type gripper.

DESCRIPTION OF PREFERRED EMBODIMENTS

Before proceeding further with the detailed description of the figures, a few items of preferred embodiments will be discussed.

With reference to the active gripper, according to an embodiment, the active gripper may further comprise at least one further contact surface each being adapted for contact by a further portion of the user's hand, each of the hand's further portions being moveable in relation to at least one of the hand's first portion, the hand's second portion and a different of the hand's further portions, and at least one further moveable member, each thereof being associated to one of the at least one further contact surface and being adapted to actively move the associated further contact surface and at least one of the remaining contact surfaces (including at least one the first and second contact surfaces) in relation to each other.

For example, the active gripper may comprise a third contact surface being adapted for contact by a third portion of the user's hand and a third moveable member associated to the third contact surface and being adapted to actively move the third contact surface in relation to at least one other contact surface, a fourth contact surface being adapted for contact by a fourth portion of the user's hand and a fourth moveable member associated to the fourth contact surface and being adapted to actively move the fourth contact surface in relation to at least one other contact surface, a fifth contact surface being adapted for contact by a fifth portion of the user's hand and a fifth moveable member associated to the fifth contact surface and being adapted to actively move the fifth contact surface in relation to at least one other contact surface, and so on.

According to an embodiment, the first contact surface may be adapted for contact by at least one finger of the user's hand, preferably a forefinger, and/or the second contact surface may be adapted for contact by a thumb of the user's hand.

According to an embodiment, each of the at least one further contact surface may be adapted for contact by at least one of a palm of the user's hand and at least one finger of the user's hand, preferably a middle finger, a ring finger or a little finger.

According to an embodiment, at least one of the moveable member and the at least one further moveable member may comprises at least one of a G-shaped lever, piezo-electric actuator, electromagnetic actuator, magnetic actuator and hydraulic and/or pneumatic actuator.

According to an embodiment, the first contact surface may be arranged on the moveable member and/or the second contact may be formed on a housing of the active gripper.

According to an embodiment, the at least one further contact surface may be arranged on the associated further moveable member.

According to an embodiment, at least one of the moveable member and the at least one further moveable member may provide at least one degree of freedom, preferably a rotational or a translational degree of freedom.

According to an embodiment, the gripper may provide at least one degree of freedom with bi-directional forces or torques to enable active grasping as well as active parting.

According to an embodiment, the gripper may provide at least one degree of freedom for relative movement between at least two groups of at least one finger.

According to an embodiment, the gripper may provide at least one degree of freedom for relative movement between the thumb and a group of at least one other finger.

In operation, additional fingers may in contact with the same moveable body as the one in contact with the thumb.

In operation, the palm of the hand may be (also) in contact with the gripper.

According to an embodiment, the gripper may provide relative movements, which are coupled with respect to a reference portion of the hand, for example a symmetrical movement of two fingers with respect to the palm of the hand.

In the case the gripper provides at least one rotational degree of freedom, there may be distance between a rotation axis of one of the at least one rotational degree of freedom and a contact point of an involved finger with a respective one of the moveable members, generating a circular trajectory of the contact point, which approximately matches a natural trajectory of the contact point on said involved finger.

According to an embodiment, the gripper may provide a rotational degree of freedom by means of a rotational actuator, which may apply a torque and/or force on the rotational degree of freedom.

According to an embodiment, the rotational actuator may be connected to the rotational degree of freedom by a force and/or torque transmission means arranged between, on the one hand, a curved portion of at least one of the moveable members or of a member connected to the moveable member and, on the other hand, an output shaft of the rotational actuator or a curved portion of a member connected to the output shaft.

According to an embodiment, the force transmission means may comprises at least one of a cable, wire, string, tendon, friction engagement, toothed gear, belt, band and chain.

According to an embodiment, the gripper may comprise at least one sensor to measure at least one of position, orientation, force, torque, speed, acceleration, strain, deformation, magnetic field, light, sound and temperature.

According to an embodiment, the active gripper may include at least one button or switch to control additional features, toggles or settings.

With reference to the haptic device, according to an embodiment, the active gripper may be (directly) attached on the end-effector.

It is first noted that the haptic device may provide at least three degrees of freedom including three translational degrees of freedom, i.e. the minimum number of degrees of freedom is three translational degrees of freedom are provided. In the case of more degrees of freedom, three translational degrees of freedom and any number of further translational degrees of freedom and any number of rotational degrees of freedom may be provided. In the following, this indicated by the term "at least three (translational) degrees of freedom".

According to an embodiment, the haptic device may comprise a grounded parallel kinematics structure providing three pure translational degrees of freedom on the end-effector.

According to an embodiment, the at least three (translational) degrees of freedom may be such that the end-effector has a constant orientation with respect to ground.

According to an embodiment, the parallel kinematics structure may comprise at least one sensor to measure at least one of position, orientation, force, torque, speed, acceleration, strain, deformation, magnetic field, light, sound and temperature.

According to an embodiment, the haptic device may comprise at least one actuator associated to at least one of the at least three (translational) degrees of freedom.

According to an embodiment, forces or torques generated by actuators may be transmitted to the end-effector as forces.

According to an embodiment, at least one of the actuators is of electromagnetic type, piezo-electric type, pneumatic and/or hydraulic type or magnetic type.

According to an embodiment, at least one actuator external to the gripper may be provided, wherein transmission of force and/or torques from the at least one external actuator to the gripper, particularly its moveable member(s), may provided by means of mechanical components. Examples for such components may include a pulley, cable, wire, string, tendon, friction engagement, toothed gear, belt, band, chain, pneumatic and/or hydraulic circuit/conduit and magnet.

According to an embodiment, the parallel kinematics structure may be a Delta parallel kinematics structure. A Delta parallel structure is described, for example, in U.S. Pat. No. 4,976,582 (R. Clavel; 11 Dec. 1990).

According to an embodiment, the haptic device may further comprise a wrist structure being arranged between the end-effector and the active gripper, the wrist structure providing at least one degree of freedom, preferably at least one rotational degree of freedom, for the active gripper.

According to an embodiment, at least one rotational axis of the wrist structure may substantially intersect in a common center of rotation.

According to an embodiment, the common center of rotation may be located—during operation by a user—inside the user's hand, preferably located between the thumb and other fingers in contact with the gripper.

According to an embodiment, the wrist structure may comprise at least one sensor to measure at least one of position, orientation, force, torque, speed, acceleration, strain, deformation, magnetic field, light, sound and temperature.

According to an embodiment, the wrist structure may comprise at least one actuator associated to at least one of its degrees of freedom.

According to an embodiment, the haptic device may be used as an instrument holding device to provide assistance to the user by compensating said instrument weight, by enabling precise positioning of said instrument, by guiding said user's gesture with force-feedback, and/or by displaying any type of information as tactile feedback to said user.

According to some embodiments, the haptic device may used as at least one of:

an instrument holding device to provide assistance to the user by compensating said instrument weight, by enabling precise positioning of said instrument, by guiding said user's gesture with force-feedback, and/or by displaying any type of information as tactile feedback to a user, a master input device to tele-operate a slave robot and/or manipulator, for interaction with a virtual environment, for example for gesture training or assessment, in the medical field, in particular for surgical operations, training and patient rehabilitation, for computer aided design, manufacturing or assembly, or for other desktop applications for home or office use, and for entertainment purposes in connection with a PC, a gaming console or a dedicated hardware system.

Preferred embodiments are described in further detail with reference to a haptic device comprising parallel kinematics structures, more particular a Delta parallel kinematics structure haptic device. References to such haptic devices are not limiting. Rather, any parallel kinematics structure haptic device can be used as basis for implementation of the teachings of the present invention.

With reference to FIGS. 1 and 2, a haptic device 2 includes a (preferably ring-shaped) base plate 4 and a movable end-effector 6. Base plate 4 is grounded by means of a grounding member 8, which comprises an at least partially ring-like portion.

End-effector 6 comprises a plate-like portion, which faces—in the illustrated condition—in a direction away from base plate 4. End-effector 6 may be used for attachment of a handle, gripper or any other means 10 that may be manually grabbed by a user for interaction with the haptic device 2. Further details concerning such means are given later.

Base plate 4 and local end-effector 6 are connected via three kinematics chains 12. Each kinematics chain 12 includes a first arm 14 and a second arm 16.

The first arms 14 are rotationally coupled to respective mounting members 18 that are in turn attached to base plate 4. First arms 14 and the respective mounting members 18 are coupled such that first arms 14 may be rotated or pivoted with respect to the associated mounting members 26. Preferably, each of these couplings includes a rotational shaft 20 extending through its associated mounting member 18 and first arm 14.

At the portion of each mounting member 18 adjacent to base plate 4, a rotational actuator 22, for example in form of an electromagnetic motor, is arranged. Each rotational actuator 22 is provided with a rotational position sensor 24 for measuring rotation of a rotational actuator's shaft (not illustrated). Further, each rotational actuator 22 comprises a pulley 26 arranged on the rotational actuator's shaft.

Each first arm 14 comprises a curved portion 28 for engagement with a respective one of the pulleys 26 by means of, for example, a cable drive 30, wire or belt.

Each second arm 16 includes two linking bars 32. At one end 34, each linking bar 32 is coupled with a respective one of the first arms 14 by means of joints or hinges 36 arranged at bars 37. Bars 37 are coupled with a respective first arm 14. At their opposing ends 38, each linking bar 32 is coupled with end-effector 6 by joints or hinges 40 arranged at bars 39, which are coupled with a respective second arm 16.

In the illustrated embodiment, the upper first arm 14 comprises, on its rotational shaft 20, a pulley 42. Pulley 42 is preferably arranged on rotational shaft 20 in a portion substantially extending parallel to base plate 4 in protruding manner. Between pulley 42 and base plate 4, a passive gravity compensation means 44 is arranged. "Passive" in this context indicates that no external energy is used for operating gravity compensation means.

Gravity compensation means 44 comprises an elastic element 46, for example in form of a (helical) traction spring, (helical) compression spring, spiral spring, leave spring, membrane or the like. Without a limitation, the following assumes a helical traction spring.

Elastic element 46 is coupled, on one of its ends, to base plate 4 and, at its other end, to pulley 42. Coupling to base plate 4 includes a cable 48, wire or the like. Coupling of elastic element 46 to pulley 42 includes also a cable 50, which is at least partially around on pulley 42 for transforming forces of elastic element 46 in forces and/or torques acting on rotational shaft 20, and, thus, on upper first arm 14.

The illustrated embodiment includes gravity compensation means associated to upper first arm 14 only. However, gravity compensation means can be also provided for at least one of the lower first arms 14.

The at least one gravity compensation means may be at least partially covered by a shrouding, casing or the like.

The at least one gravity compensation means are intended to provide forces and/or torques on at least one associated first arm 14 such that the accumulated effect of gravity on every movable part of the haptic device 2 is at least partially compensated.

For the orientation of the illustrated embodiment, in the haptic device's symmetry axis is oriented horizontally to grounding member and, thus, ground, it is contemplated to exert, by means of the at least one gravity compensation means, forces and/or torques on the associated first arm(s) 14 in the direction(s) indicated by arrow(s) 52.

Assuming gravity compensation means 44 to include a traction spring, the part of the upper first arm 14 coupled with the upper second arm 16 is pulled "backwards" to base plate 4.

Using a compression spring or the like is also contemplated. In such case, flexible couplings to base plate 4 and first arm 14—line the above cables 48 and 50—may be replaced by couplings capable of transmitting the respective forces and/or torques (e.g. Bowden cables; connections that may be bent traverse their longitudinal axes and capable of force transmission in their longitudinal axes). For the embodiment here, a compression spring would push the part of the upper first arm 14 coupled with the upper second arm 16 towards base plate 4.

Depending on the type of gravity compensation means possibly used with one or both lower first arms 14, such "pulling" and/or "pushing" action is also intended.

Due to its structure and orientation in the illustrated embodiment, gravity effects on moveable parts of haptic device 2 may vary with the position of end-effector 6 and may possibly result in non-linear accumulated gravity effects. In order to take into account such and any further nonlinear gravity effects, gravity compensation means having a progressive or degressive behavior may be used. In addition or as alternative, pulley 42 may have an irregular circumference leading to a variable radius with respect to its annular rotation.

As set forth above, a gripper 10 may be attached to a local end-effector 6. In the case gripper 10 comprises no movable parts and/or is fixed to end-effector 6 such that no relative movements there between are possible, the at least one gravity compensation means may be also adapted such that gravity effects on the movable parts of haptic device 2 and gripper 10 are compensated for.

For relative movements between gripper 10 and local end-effector 6, a so-called wrist structure may be arranged between gripper 10 and local end-effector 6.

In the case gripper 10 includes movable parts and/or is movable with respect to local end-effector 6, gravity compensation may be provided in separated manner with respect to movements of gripper 10 and/or a wrist structure in relation to end-effector 6.

Haptic device 2 as such provides three pure translational degrees of freedom on end-effector 6. Due to the kinematics architecture of haptic device 2, any degree of freedom provided by gripper 10 and/or a wrist structure, particularly angular degrees of freedom, are completely decoupled from the translational degrees of freedom. This allows compensating gravity effects, on the one hand, with respect to translational degrees of freedom, and, on the other, with respect to angular degrees of freedom. Gravity compensation concerning translational degrees of freedom may be provided as set forth above, wherein gripper 10 and optional wrist structure 54 can be considered as additional mass on end-effector 6 resulting in additional gravity to be considered in gravity compensation.

A simple wrist structure may provide one angular degree of freedom, i. e. one degree of freedom in a rotation. More complex wrist structures 54 may provide more than one angular degree of freedom.

Degrees of freedom provided by a wrist structure may be so-called "passive" or "active" degrees of freedom. In this context, the term "passive" indicates that forces and/or torque externally applied, for example by a user, may induce displacement along a respective degree of freedom. Contrary thereto, the term "active" (or "actuated") indicates that controlled forces and/or torques can be displayed to a user by means of energy supply along respective degrees of freedom, for example, using one or more of the device's actuators. Such a force and/or torque generation towards a user may include stepwise actions, such as switching on and off an actuator, linear actions and nonlinear actions of any type.

Sensors may be associated to one or more of the degrees of freedom provided by the wrist structure in order to obtain movement data and/or data related to forces and/or torques. Sensors may be used for passive and/or active degrees of freedom. It is noted that an active or actuated degree of freedom does not necessarily imply the presence of a sensor. Haptic devices according to the present invention, particularly those including a Delta structure, are capable of obtaining a data related to forces and/or torques displayed on the end-effector on the basis of operational information on their actuators. For example, voltage and/or current supply to actuators 22, which physically relate to the actuators' forces/torques and speeds, may be measured to derive therefrom forces and/or torques at end-effector 6.

FIGS. 1 and 2 show a gripper 10 providing a passive degree of freedom by means of a button or switch (not illustrated). The button or switch can be considered providing a passive degree of freedom in form of two distinct stages, such as button pressed or released and switch in on and off position, respectively. The button or switch (as any further comparable component) provides a passive degree of freedom in the sense that no energy—apart energy provided by a user—is provided to it. However, it is possible to use a button, switch or the like providing an active degree of freedom. This may be achieved by, for example, controlling the button's mechanical resistance against activation (pressing) by a user and/or exhibiting forces towards a user during its use.

The wrist structure 54 arranged between gripper 10 and local end-effector 6, as shown in FIGS. 1 and 2, provides one degree of freedom for rotational movement. The wrist structure's degree of freedom may be passive or active. In the illustrated embodiment, wrist structure 54 comprises a locking mechanism (not illustrated) for selectively enabling and disabling rotational movements of wrist structure 54 and, thus, gripper 10. For example, the locking mechanism may include a screw, bold or any means suitable for locking/unlocking rotations.

A calibration peg 56 is rigidly connected to end-effector 6 and enables calibration of the haptic device's position sensors. During calibration procedure, peg 56 is moved into one or more corresponding calibration hole(s) 58 provided on grounding plate 8. A contact switch 57 located on the backside of peg 56 detects this action and resets the position sensors to a predefined value, thereby calibrating position measurement.

FIGS. 3A and 3B show perspective illustrations of a product-like version of the embodiment of FIGS. 1 and 2.

An enhanced embodiment of a wrist structure for use with haptic devices according to the present invention is illustrated in FIGS. 4 to 7.

FIGS. 4 to 7 illustrates, as a part of a haptic device, end-effector 6. The illustrated embodiment 100 of a wrist structure comprises three pivotable connections 102, 104 and 106, for example in form of pivot joins. Each of the pivotable connections 102, 104 and 106 provides a rotational degree of freedom with respect to end-effector 6. These rotational degrees of freedom may be at least partially active or—as assumed in the following—passive.

Each pivotable connection 102, 104 and 106 is provided with at least one rotational position sensor (not shown).

The wrist structure embodiment 100 comprises a gripper 108. Gripper 108 can be considered as interface for a user's hand. Gripper 108 is fixed to pivotable connection 106 and provides contact surfaces for the hand and fingers/thumb of a user. In the illustrated embodiment, gripper 108 is designed for manipulation by a user's right hand. Of course, respective designs for left hand use (e.g. laterally reversed design as compared with the illustrated design) and left-and-right hand use (ambidextrous) are also contemplated.

Gripper 108 comprises a housing 110 having a contact surface 112 for a user's thumb and a contact surface 114 for the user's forefinger. For the remaining fingers, a contact surface 116 is provided.

Contact surface 114 for a user's forefinger is arranged at a movable body 118. Movable body 118 has a shape that can be consider as G-like and comprises a curved portion 120. Curved portion 120 has, on one of its ends, contact surface 114 attached thereto. At the other end, curved portion 120 is connected, via a straight portion 122, with a pivotable connection 124.

As best can be seen in FIGS. 6 and 7, gripper 108 includes, encased in housing 110, a rotational actuator 126. Rotational actuator 126 has a shaft 128 on which a pulley 130 is rigidly mounted. A cable 132, wire or the like is connected to curved portion 120 on the one hand, and to pulley 130, on the other hand, such that rotations of shaft 128 and pulley 130, respectively, make moveably member 118 to rotate with respect to a rotational axis 134 provided by pivotable connection 124.

The engagement of curved portion 120 and pulley 130 also serves for transmissions of rotations of movable body 118 via pulley 130, shaft 128 to rotational actuator 126 and, particularly, an orientation sensor 131 thereof.

This arrangement allows, on the one hand, to actively move movable member 118 by means of rotational actuator 128 such that contact surface 114 is moved. A user having placed the forefinger on contact surface 114 will experience such movements.

On the other hand, this arrangement allows movements of movable member 118 under control of a user's forefinger and, by means of orientation sensor of rotational actuator 126, sensing and measurement of such user induced movements.

Contact surface 114 may be shaped such that a user's forefinger is engaged for pushing and pulling action. In order to enable parting motion of a forefinger, a second contact surface (not illustrated) may be provided on movable body 118 in order to be, for example, wound around the forefinger. Examples for such embodiments include a ring, belt, fingerstall, wire and the like.

Buttons, switches or the like may be also provided on gripper 108, for example, for activation by a user's thumb and/or fingers. It is also contemplated to provide contact surface 114 with a button, contact sensitive element or the like for activation by a forefinger.

As set forth above, pivotable connections 102, 104 and 106 provide three rotational degrees of freedom, which axes intersect in a common center of rotation. Preferably, the common center of rotation substantially corresponds with a location at half distance between contact surface 112 and contact surface 116. This allows free access to the common center of rotation by a user's hand, which rotation center being located inside wrist structure 100. As a result, parasitic forces and torques may be avoided, for example, in the case torques and/or forces are displayed to the user's hand.

As set forth above, gravity compensation can be separately achieved for, on the one hand, the translational degrees of freedom provided by the parallel kinematics structure and, on the other hand, for the rotational degrees of freedom provided by a wrist structure. This also applies to the wrist structure shown in FIGS. 4 to 7. For gravity compensation for wrist structure 100, a counterweight structure 136 is arranged at pivotable connection 102 and extending therefrom. Counterweight structure 136 may be integrally formed, with a bar 138 connecting pivotable connections 102 and 104.

As further gravity compensation measure, the center gravity of gripper 108 may be located just below the above common center of rotation. This arrangement allows inherent restoring forces and/or torques for returning gripper 108 in upright nominal (or resting) position when not in use (not manipulated, in contact with a user's hand). In such cases, the center gravity of gripper 108 can be considered as counterweight.

Figure 8A:
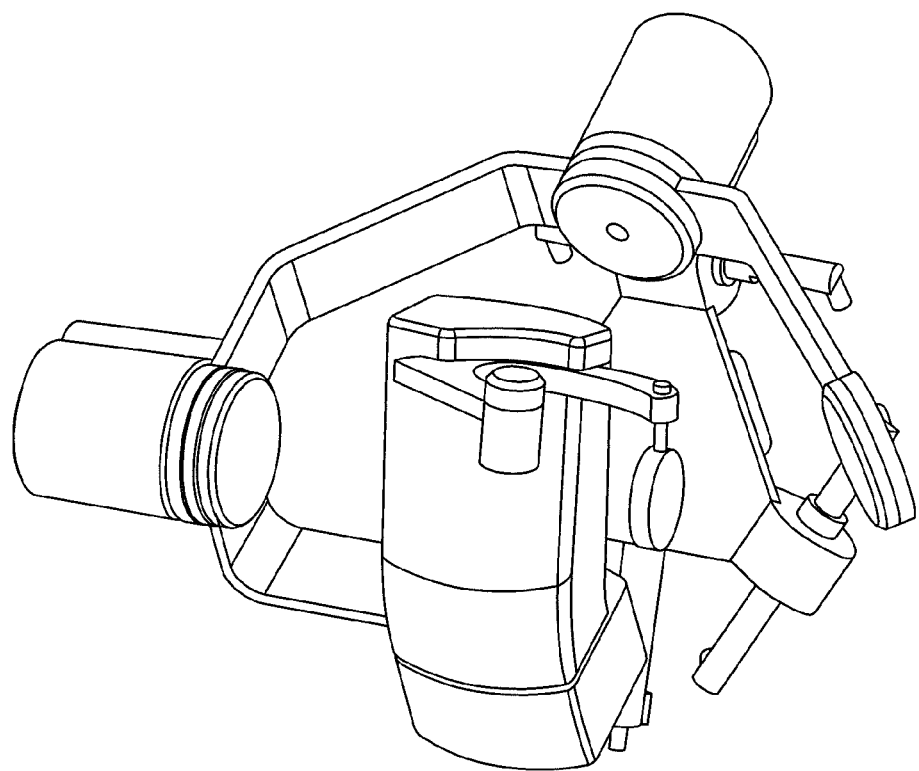
Figure 8B:
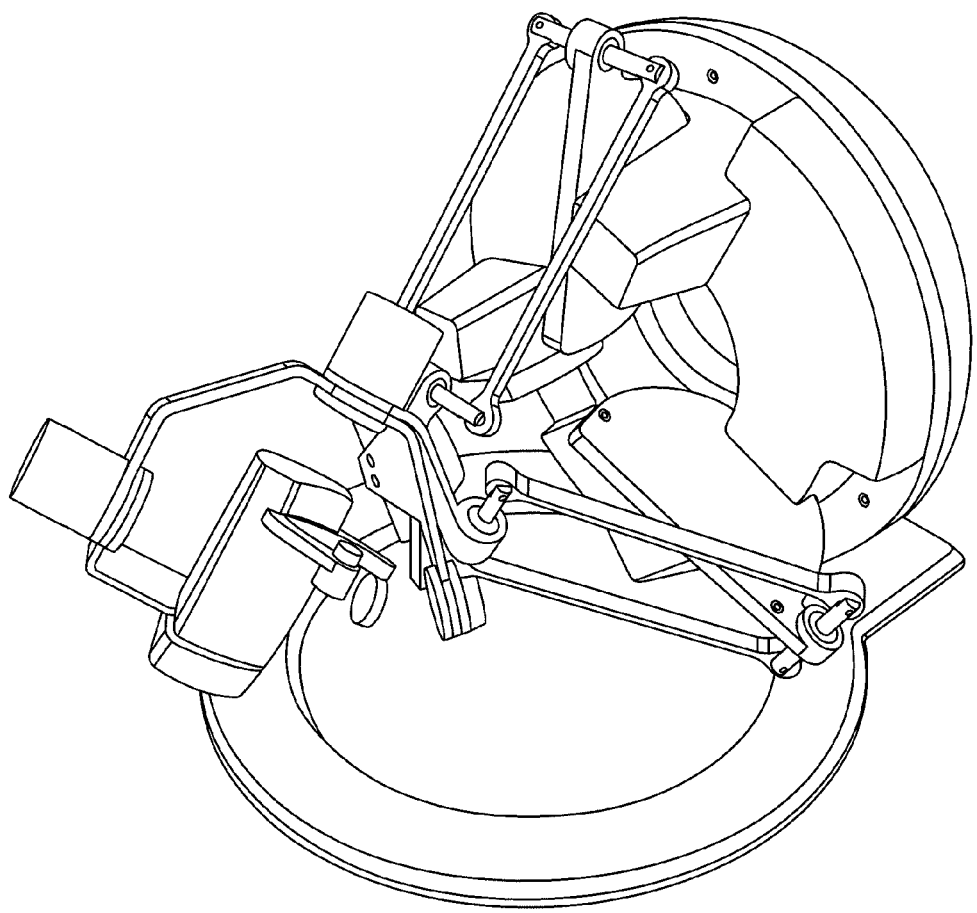
Figure 8C:
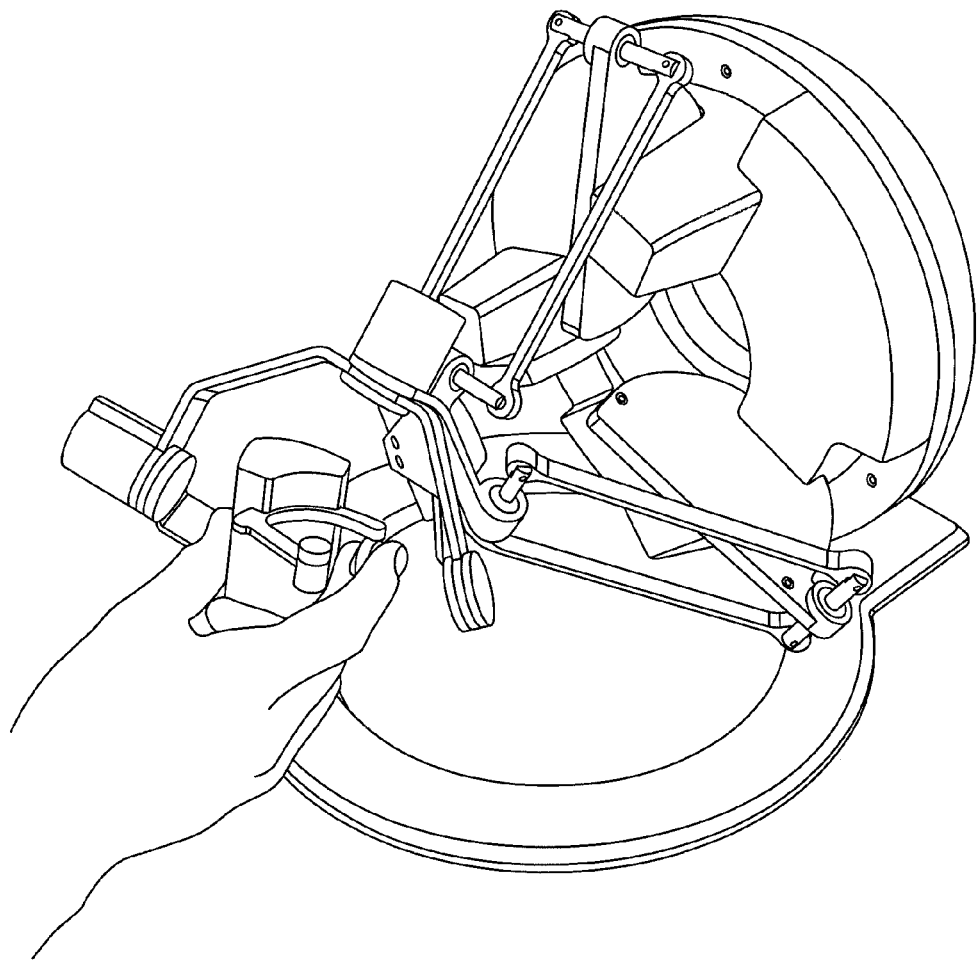
Figure 9A:
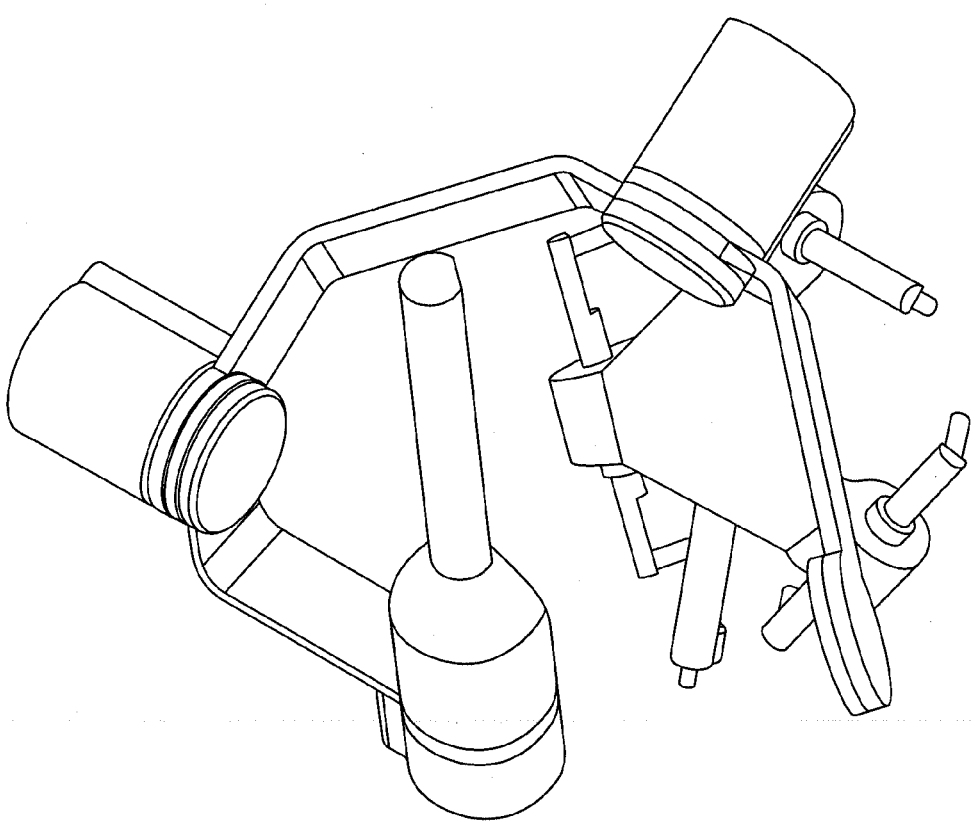
Figure 9B:
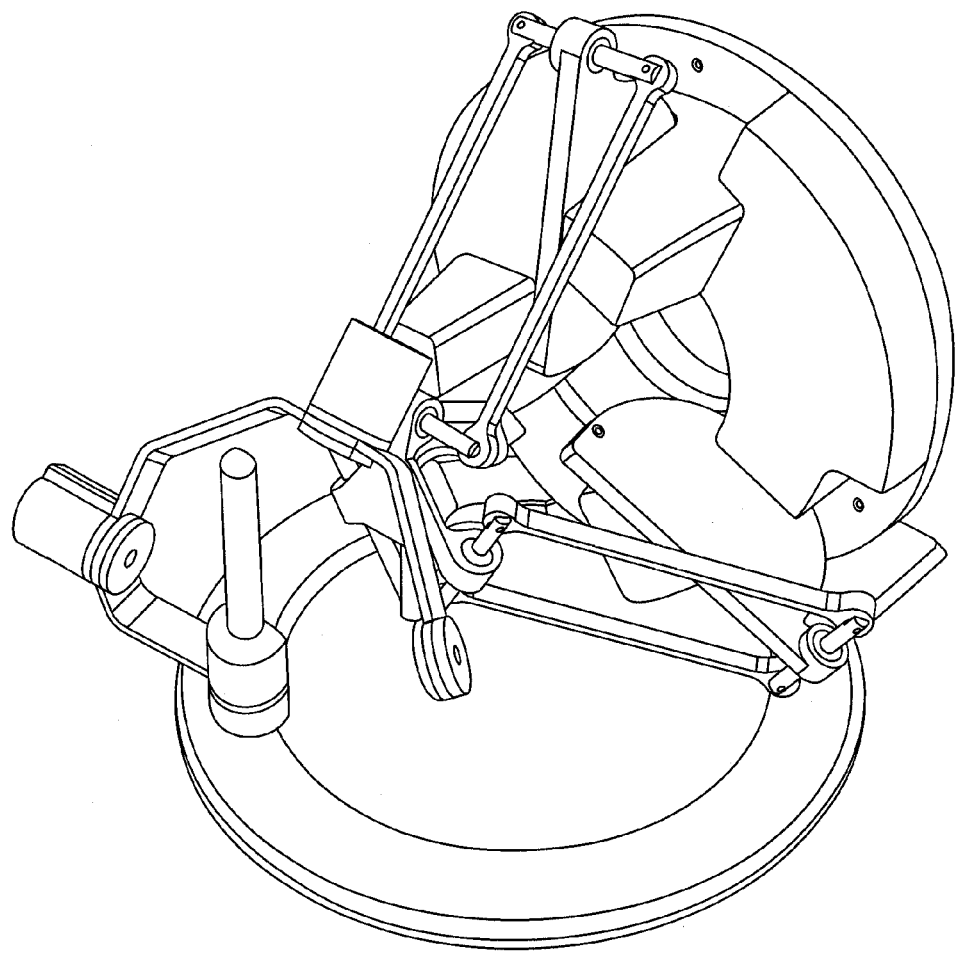
Figure 9C:
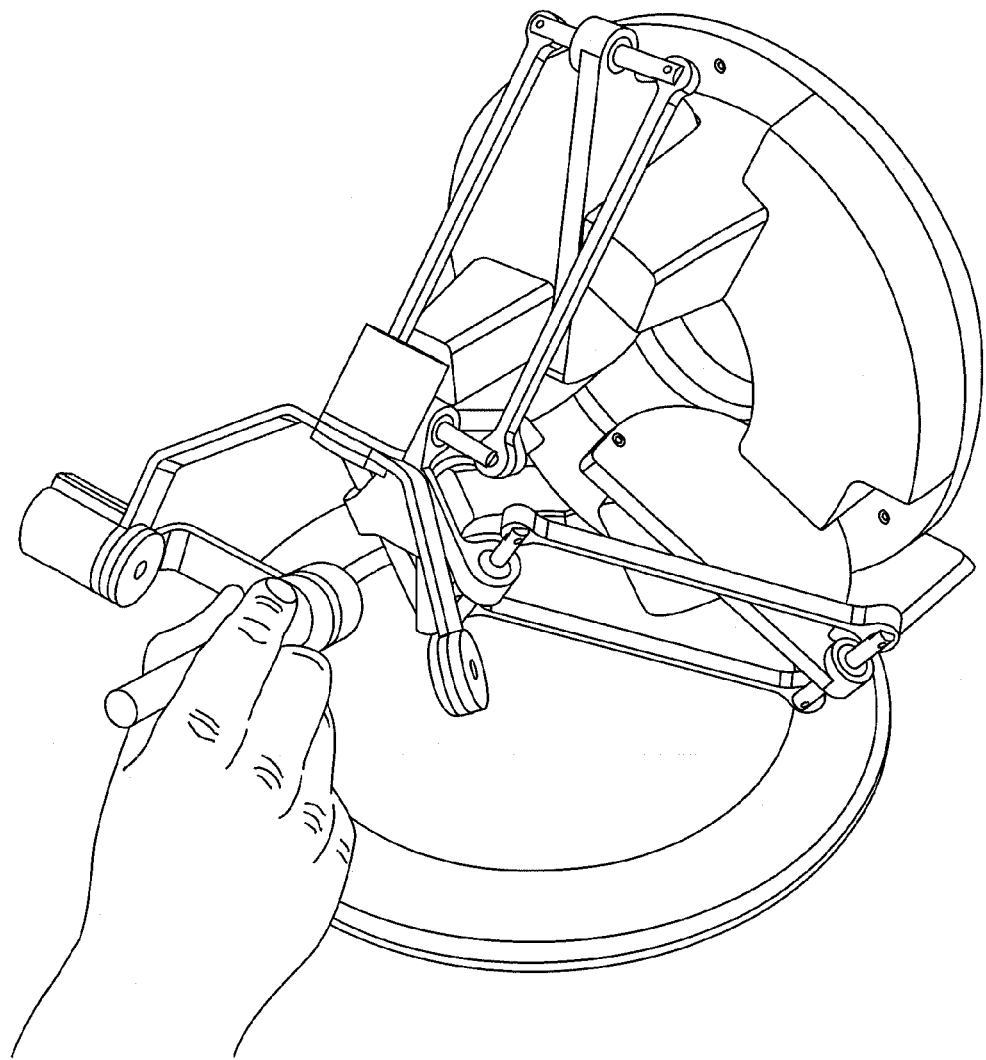
Figure 9D:
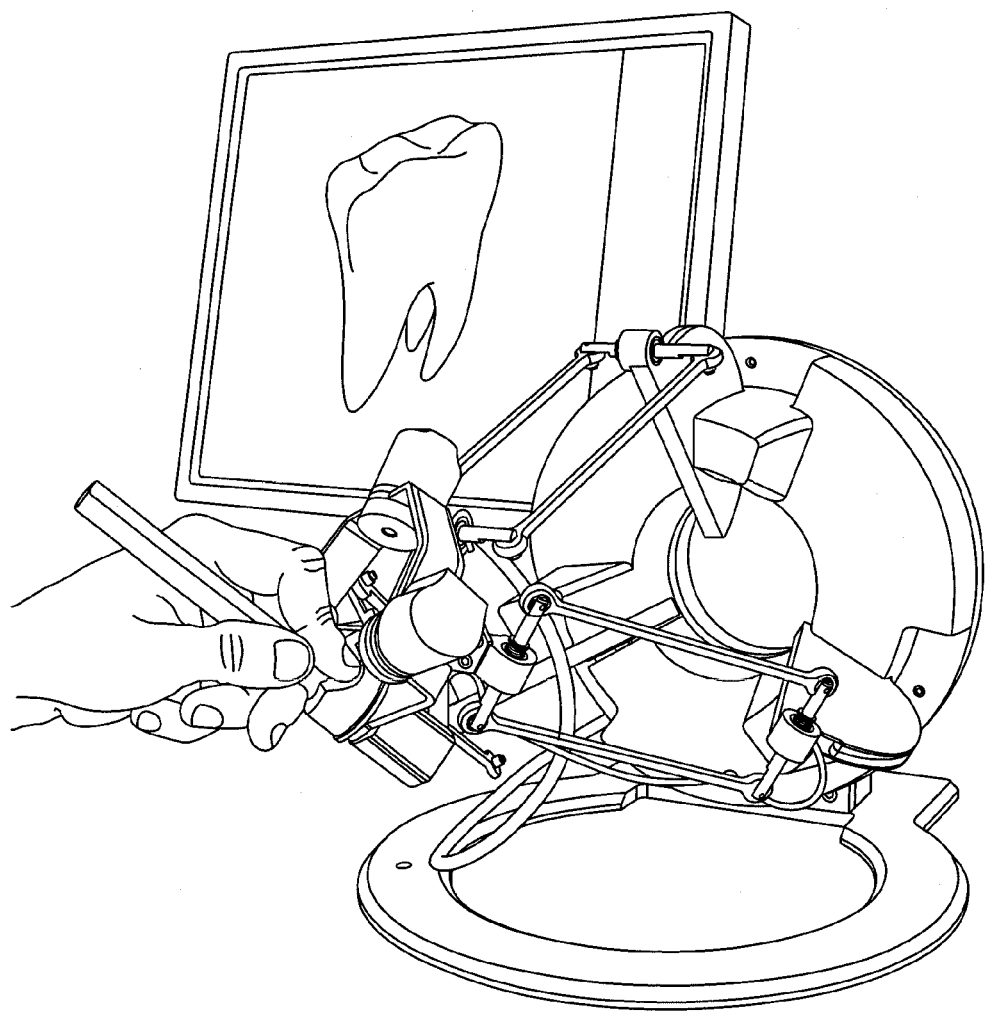

Perspective illustrations of the embodiment of FIGS. 4 to 7 are shown in FIGS. 8A to 8C. In a modification of the embodiment of FIGS. 4 to 7, gripper 108 may have a pen-like shape. Product-like versions of a pen embodiment are shown in FIGS. 9A to 9D.

Further embodiments of an active gripper according to the present invention are described in the following:

In addition or as alternative, for one or more of the remaining fingers and also the thumb one or more moveable members, which are comparable in function and structure to moveable member 118, may be provided. In such embodiments, moveable members for finger preferably are of the above described "G-type".

However, moveable members for use with an active gripper according to the present invention may include a (curved) lever, piezo-electric actuator, electromagnetic actuator, magnetic actuator and hydraulic and/or pneumatic actuator. Using an actuator, the associated contact surface may be provided on or may be formed by a moveable part the actuator.

In any case, it is contemplated to provide—by means of the (at least one) moveable member of the active gripper—movements towards part of a user's hand in the form of stepwise movements, smooth quasi-linear movements, actually linear movements and/or movements having any desired characteristic (e.g. having any behavior providing a natural sensation to a user).

It is also contemplated to use—in addition to any passive gravity compensation described above—active gravity compensation to remove—if any—gravity affects not completely compensated passively.

Active gravity compensation may be achieved by operating at least one of the device's actuators and/or at least one additional actuator (not shown) acting on the parallel kinematics claim 6 and/or pivotable connection of a wrist structure and/or gripper accordingly, i. e. moving the end-effector and/or the wrist structure of the gripper in directions opposite to gravity related movements.

Integration of an active gripper to a haptic device structure enables a much more natural interaction with objects in a virtual or remote environment. Grasping and parting movements between thumb and other fingers are very important in human manipulation abilities. They allow for a greater variety of interaction possibilities than with a regular point interaction force feedback device.

In the medical field, surgical operations often include a pinching or scissor instrument, generating the need for a haptic input device, which can reproduce this relative movement between fingers. Simulated operations for training and assessment as well as real operations realized by tele-operating a slave manipulator require at least one gripping degree of freedom. Force feedback on parting movement can efficiently simulate an instrument failure or the contact forces on a "sticky" or viscous body.

The invention claimed is:

1. A haptic device comprising
    an active gripper comprising
        a first contact surface (114) being adapted for contact by a first portion of a hand of a user,
        a second contact surface (112) being adapted for contact by a second portion of the user's hand, which hand's second portion being moveable in relation to the hand's first portion; and a moveable member (118) arranged between the first contact surface (114) and the second contact surface (112) and being adapted to actively move the first contact surface (114) and the second contact surface (112) in relation to each other;

a base plate (4);

an end-effector (6); and a parallel kinematics structure arranged between the base plate (4) and the end-effector (6);

the parallel kinematics structure providing three translational degrees of freedom on the end-effector (6) such that the orientation of the end-effector (6) is constant with respect to the base plate (4), wherein the parallel kinematics structure is a Delta parallel kinematics structure.

2. The haptic device according to claim 1, wherein the active gripper is attached on the end-effector (6).

3. The haptic device according to claim 1, further comprising a wrist structure (54, 100) being arranged between the end-effector (6) and the active gripper, the wrist structure (54, 100) providing at least one degree of freedom for the active gripper, wherein rotational degrees of freedom provided by the wrist structure (54, 100) are completely decoupled from the translational degrees of freedom of the parallel kinematics structure.

4. The haptic device according to claim 3, wherein the degrees of freedom of the wrist structure (54, 100) are at least partially active.

5. The haptic device according to claim 3, wherein the wrist structure (54, 100) provides rotational degrees of freedom.

6. The haptic device according to claim 3, wherein rotational axes of the wrist structure (54, 100) have a common center of rotation.

7. The haptic device according to claim 6, wherein, during operation, the common center of rotation is located inside the user's hand.

8. The haptic device according to claim 1, wherein the parallel kinematics structure comprises at least one actuator associated to the three translational degrees of freedom, the at least one actuator for generating forces, torques, or combinations thereof for transmission to the end-effector (6) to provide force feedback to a user.

9. The haptic device according to claim 1, further comprising at least one further contact surface each being adapted for contact by a further portion of the user's hand, each of the hand's further portions being moveable in relation to at least one of the hand's first portion, the hand's second portion and a different of the hand's further portions, and at least one further moveable member, each thereof being associated to one of the at least one further contact surface and being adapted to actively move the associated further contact surface and at least one of the remaining contact surfaces in relation to each other.

10. The haptic device according to claim 9, wherein, in the active gripper, each of the at least one further contact surface is adapted for contact by at least one of a palm of the user's hand and at least one finger of the user's hand.

11. The haptic device according to claim 9, wherein the active gripper comprises at least one of the following features:

the first contact surface (114) is arranged on the moveable member (118), the second contact surface (112) is formed on a housing (110) of the active gripper, and the at least one further contact surface is arranged on the associated further moveable member.

12. The haptic device according to claim 1, wherein, in the active gripper, at least one moveable member (118) includes at least one of a G shaped lever, a piezo-electric actuator, an electromagnetic actuator, a magnet actuator, a hydraulic actuator, a pneumatic actuator, and combinations thereof for generating force feedback.

13. The haptic device according to claim 1, wherein the active gripper provides a rotational degree of freedom by means of a rotational actuator for applying a torque, a force, or combinations thereof on the rotational degree of freedom to provide force feedback for a user.

14. The haptic device according to claim 13, wherein the rotational actuator is connected to the rotational degree of freedom by a force and/or torque transmission means.

15. The haptic device according to claim 14, wherein the force and/or torque transmission means comprises a cable and a pulley.

16. The haptic device according to claim 1, wherein the active gripper comprises at least one of the following features:

the first contact surface (114) is adapted for contact by at least one finger of the user's hand, and the second contact surface (112) is adapted for contact by a thumb of the user's hand.

17. The haptic device according to claim 1, wherein the active gripper provides a degree of freedom by means of a button or switch.

\* \* \* \* \*